(12) United States Patent
Ramaker et al.

(10) Patent No.: US 7,240,781 B2
(45) Date of Patent: Jul. 10, 2007

(54) POSITIVE DISPLACEMENT SORTER

(75) Inventors: James W. Ramaker, Ada, MI (US); Frank W. Veit, Spring Lake, MI (US); Rhonda J. Verploegen, Sparta, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/162,802

(22) Filed: Sep. 23, 2005

(65) Prior Publication Data
US 2006/0060447 A1 Mar. 23, 2006

Related U.S. Application Data

(60) Provisional application No. 60/612,370, filed on Sep. 23, 2004.

(51) Int. Cl.
*B65G 47/10* (2006.01)
*B65G 47/24* (2006.01)

(52) U.S. Cl. .............................. 198/370.02; 198/370.13
(58) Field of Classification Search ........... 198/370.02, 198/370.13, 890, 364, 717
See application file for complete search history.

(56) References Cited

U.S. PATENT DOCUMENTS

| | | | |
|---|---|---|---|
| 3,361,247 A | 1/1968 | Lauzon et al. ................. 198/38 |
| 3,710,923 A | 1/1973 | Fromme et al. | |
| 4,039,070 A | 8/1977 | Harrison ...................... 198/370 |
| 4,501,365 A | 2/1985 | Peyton et al. ................ 209/548 |
| 4,738,347 A | 4/1988 | Brouwer et al. ............. 198/372 |
| 4,884,677 A | 12/1989 | Yu et al. ...................... 198/370 |
| 4,892,186 A | 1/1990 | Frei ....................... 198/803.01 |
| 5,127,510 A | 7/1992 | Cotter et al. ................. 198/372 |
| 5,165,515 A | 11/1992 | Nitschke et al. ....... 198/349.95 |
| 5,285,886 A | 2/1994 | Ostholt et al. ............... 198/370 |
| 5,409,095 A | 4/1995 | Hoshi et al. ................. 198/372 |
| 5,590,758 A * | 1/1997 | Wilkins et al. ........... 198/890.1 |
| 5,613,591 A * | 3/1997 | Heit et al. .............. 198/370.02 |

(Continued)

FOREIGN PATENT DOCUMENTS

JP 09175636 A 7/1997

(Continued)

OTHER PUBLICATIONS

International Search Report (Form PCT/ISA/210) from corresponding Patent Cooperation Treaty Application No. PCT/US2005/034459, dated Jan. 3, 2006.

*Primary Examiner*—Douglas Hess
(74) *Attorney, Agent, or Firm*—Van Dyke, Gardner, Linn & Burkhart, LLP (57) ABSTRACT

A positive displacement sorter includes a conveying surface, a plurality of pusher shoes capable of traveling laterally of the conveying surface travel direction, a diverting assembly selectively diverting the pusher shoes and a control. The pusher shoes are generally separated from each other and the travel of direction by a shoe pitch. The diverting assembly includes a plurality of diverting rails extending generally diagonally under the conveying surface and a plurality of actuators associated with the diverting rails. The control is capable of controlling at least two of the actuators in a manner that selectively diverts at least two of the pusher shoes that are spaced apart in integer increments of the shoe pitch notwithstanding that the actuators are separated from each other by more than the shoe pitch.

20 Claims, 13 Drawing Sheets

U.S. PATENT DOCUMENTS

| | | | |
|---|---|---|---|
| 5,732,814 A | 3/1998 | Owczarzak et al. | 198/890 |
| 5,826,695 A | 10/1998 | Van Den Goor | 198/370.02 |
| 5,927,465 A | 7/1999 | Shearer, Jr. | 198/370.02 |
| 5,950,798 A | 9/1999 | Bonnet | 198/370.02 |
| 5,967,289 A | 10/1999 | Kelsey | 198/370.02 |
| 6,041,909 A | 3/2000 | Shearer, Jr. | 198/370.02 |
| 6,283,271 B1 * | 9/2001 | van den Goor | 198/370.02 |
| 6,481,559 B1 | 11/2002 | Maeda et al. | 198/370.02 |
| 6,513,642 B1 | 2/2003 | Shearer, Jr. et al. | 198/370.02 |
| 6,615,972 B2 | 9/2003 | Veit et al. | 198/370.02 |
| 6,702,106 B1 * | 3/2004 | Sweazy | 198/890 |
| 6,705,452 B2 | 3/2004 | Greve et al. | 198/370.02 |
| 6,802,412 B2 | 10/2004 | Lapeyre et al. | 198/370.02 |
| 6,814,216 B2 | 11/2004 | Veit et al. | 198/370.02 |
| 6,860,376 B1 * | 3/2005 | Heit et al. | 198/370.02 |
| 6,860,383 B2 | 3/2005 | Veit et al. | 198/815 |
| 6,866,136 B2 | 3/2005 | Veit et al. | 198/370.02 |
| 6,910,567 B2 * | 6/2005 | Van Den Goor | 198/370.02 |
| 6,923,308 B2 | 8/2005 | Veit | 198/370.02 |
| 6,935,483 B2 | 8/2005 | Veit et al. | 198/370.02 |
| 6,951,274 B2 * | 10/2005 | Zeitler et al. | 198/890 |
| 6,974,019 B2 * | 12/2005 | Lapeyre et al. | 198/370.02 |
| 7,055,669 B2 * | 6/2006 | Veit | 198/370.02 |
| 7,086,519 B2 * | 8/2006 | Veit et al. | 198/370.02 |
| 7,117,988 B2 * | 10/2006 | Veit et al. | 198/802 |
| 2003/0132143 A1 | 7/2003 | Cochran et al. | |
| 2005/0023108 A1 | 2/2005 | Verploegen et al. | 198/370.02 |

FOREIGN PATENT DOCUMENTS

| | | |
|---|---|---|
| JP | 11193128 A | 7/1999 |
| WO | WO 02/26602 A2 | 4/2002 |
| WO | WO 2004/080850 A2 | 9/2004 |

* cited by examiner

POSITIVE DISPLACEMENT SORTER

CROSS-REFERENCE TO RELATED APPLICATION

This application claims priority from U.S. provisional patent application Ser. No. 60/612,370, filed on Sep. 23, 2004, the disclosure of which is hereby incorporated herein by reference in its entirety.

BACKGROUND OF THE INVENTION

This invention relates generally to conveyor sortation systems, or sorters, and, in particular, diverters used in such sortation systems. The invention is especially useful with sortation systems that, at least initially, divert articles without imparting a rotational motion on the article, also known as a parallel sorter. However, the invention is capable of other applications.

Various forms of conveyor sortation systems have been known, such as paddle diverters, pushers, pop-up chain and belt transfer assemblies, and the like. One particular advantageous form of a sortation system is a positive displacement sortation system in which a series of pusher shoes are mounted to travel in the direction of the conveying surface and, when diverted, to travel laterally along the conveying system to divert articles on the conveying surface. For example, articles may be diverted to takeaway conveyors, or spurs, arranged either on one side of the conveying surface, thereby defining a unilateral divert, or on both sides of the conveying surface, thereby defining a bilateral divert. The pusher shoes are propelled laterally by a propelling member extending below the conveying surface and selectively engaging a diverter rail which extends diagonally under the conveying surface. Diverters associated with the diverting rail selectively divert the propelling member onto the associated diverting rail in order to cause the pusher shoes to travel laterally of the conveying surface. If a particular pusher shoe is not diverted onto a particular diverting rail, then the shoe continues to travel solely in the direction of the conveying surface unless a downstream diverter diverts the pusher shoe onto its associated diverter rail. Examples of such positive displacement sorters are disclosed in commonly assigned U.S. Pat. Nos. 4,738,347 and 5,127,510, the disclosures of which are hereby incorporated herein by reference. Other examples of positive displacement sorters are disclosed in U.S. Pat. Nos. 3,361,247 and 4,884,677.

One form of a diverter is disclosed in U.S. Pat. No. 5,409,095, the disclosure of which is hereby incorporated herein by reference. The '095 patent discloses a diverter made up of an electromagnet that, when energized, attracts the propelling assembly of the pusher shoe and guides the propelling assembly onto the associated diverting rail. In the embodiment illustrated in the '095 patent, the propelling member includes a bearing made of a ferromagnetic, or magnetically permeable, substance, such as iron alloy. The electromagnet, when energized, attracts the bearing thereby diverting the associated pusher shoe onto the diverting rail associated with the diverter. The electromagnetic diverter disclosed in the '095 patent is desirable because it is capable of diverting pusher shoes traveling at a high rate of speed thereby increasing the throughput of articles sorted by the sorter. Additionally, the pusher shoes can be diverted with less noise than is produced with mechanical or electromechanical diverters.

Another form of diverter is a parallel divert sorter which, at least initially, diverts articles without rotating the articles. Such a parallel divert sorter is disclosed in commonly assigned U.S. Pat. Nos. 5,165,515; 5,927,465; 6,041,909; and 6,513,642 B1, the disclosures of which are hereby incorporated herein by reference. Because the articles are at least initially diverted without rotating the articles, it is possible to include a smaller gap between articles because it is not necessary to leave a sufficient gap for rotation of the articles. This also improves the throughput of the sorter. One difficulty of using an electromagnetic diverter with a parallel divert sorter is that it may be necessary to space the diverting rails and diverters as close together as the pitch between the pusher shoes. Because pusher shoe pitch may be as low as 5 or 6 inches, it may be necessary to utilize as low as 5-inch or 6-inch spacing between magnetic diverters. Because of the magnitude of the electromagnetic force necessary to attract the bearing of a pusher shoe in order to divert that pusher shoe onto a diverting rail, the size of the electromagnetic diverter becomes impractical for use in a parallel divert sorter of the type disclosed in the '515, '465, '909 and '642 patents.

DESCRIPTION OF THE PREFERRED EMBODIMENT

Figure 1:
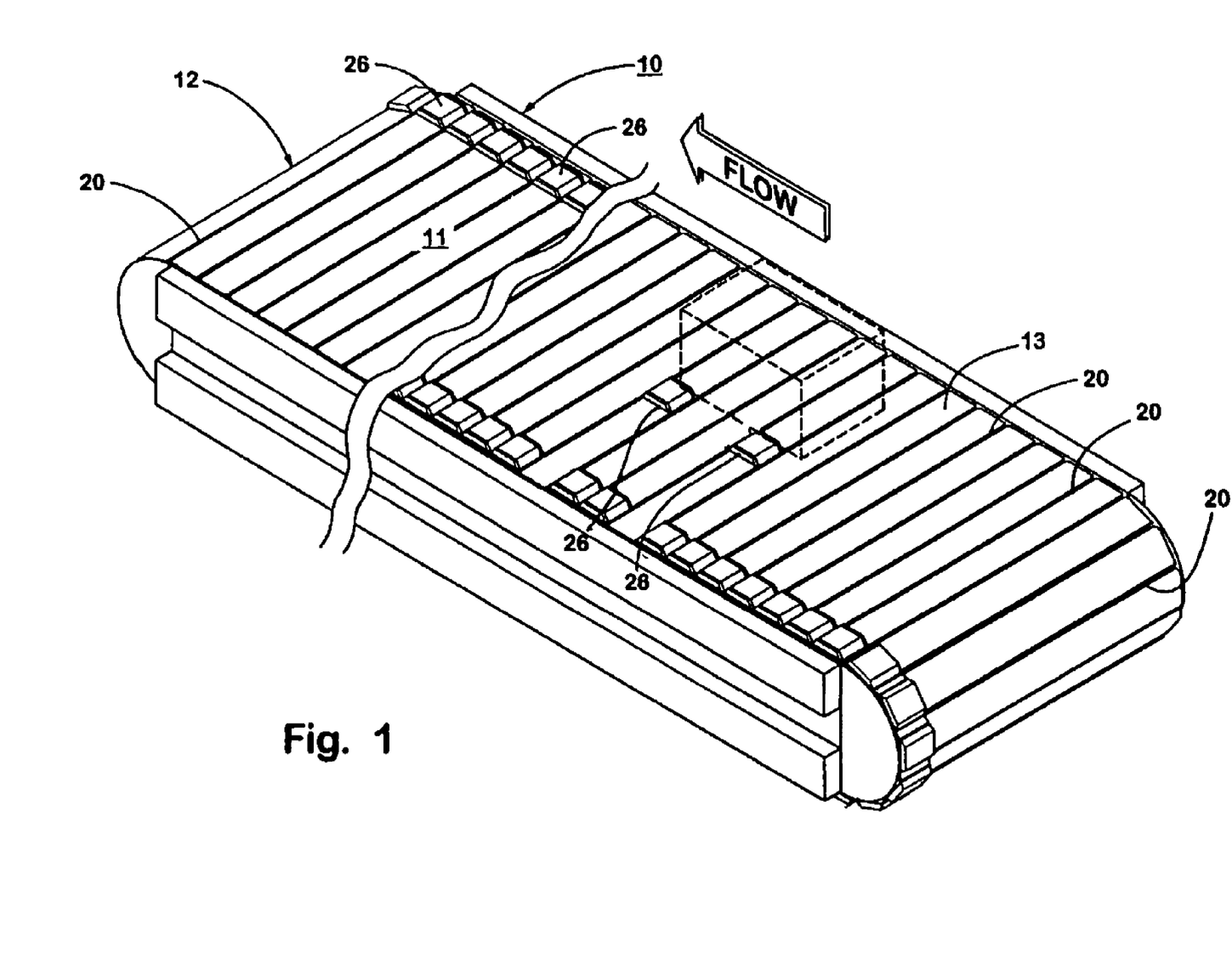
FIG. 1 is a perspective view of a sorter assembly, according to the invention.

Referring now specifically to the drawings, and the illustrative embodiments depicted therein, a sorter assembly, such as a conveyor sortation system, 10 is made up of a plurality of slats 20, which are interconnected in an endless web 12 with pusher shoes, or diverter shoes, 26 traveling along one or more of the slats to laterally displace articles on a conveying surface 11 defined by a top run 13 of endless web 12 (FIG. 1). Diverter assemblies 16 laterally displace pusher shoes 26, which have at least one article contacting member 28 extend above conveying surface 11 to divert articles onto selected spurs (not shown) in order to sort the articles. To do this, diverter assemblies 16 include diverter rails 17 extending generally diagonally across the conveying surface beneath the web and diverter switches, or actuators, 18 to divert pusher shoes to individual diverter rails. In the illustrative embodiment, diverter switches 18 are electromagnetic actuators of the type disclosed in U.S. Pat. No. 5,409,095. Such electromagnetic actuator directs a pusher shoe toward the corresponding diverter rail by magnetically attracting a portion of the pusher shoe. However, the invention may also be embodied in mechanical diverters, pneumatic diverters or some combination of magnetic, mechanical and/or pneumatic diverters. Further details of sorter assembly 10 not disclosed herein may be provided in accordance with the disclosures in commonly assigned U.S. Pat. Nos. 5,127,510; 5,732,814; 6,814,216 B2; 6,860,383 B2; 6,866,136 B2; 6,923,308 B2; and 6,935,483 B2; and U.S. Patent Application Publication 2005/0023108 A1, the disclosures of which are hereby collectively incorporated herein by reference.

Figure 7:
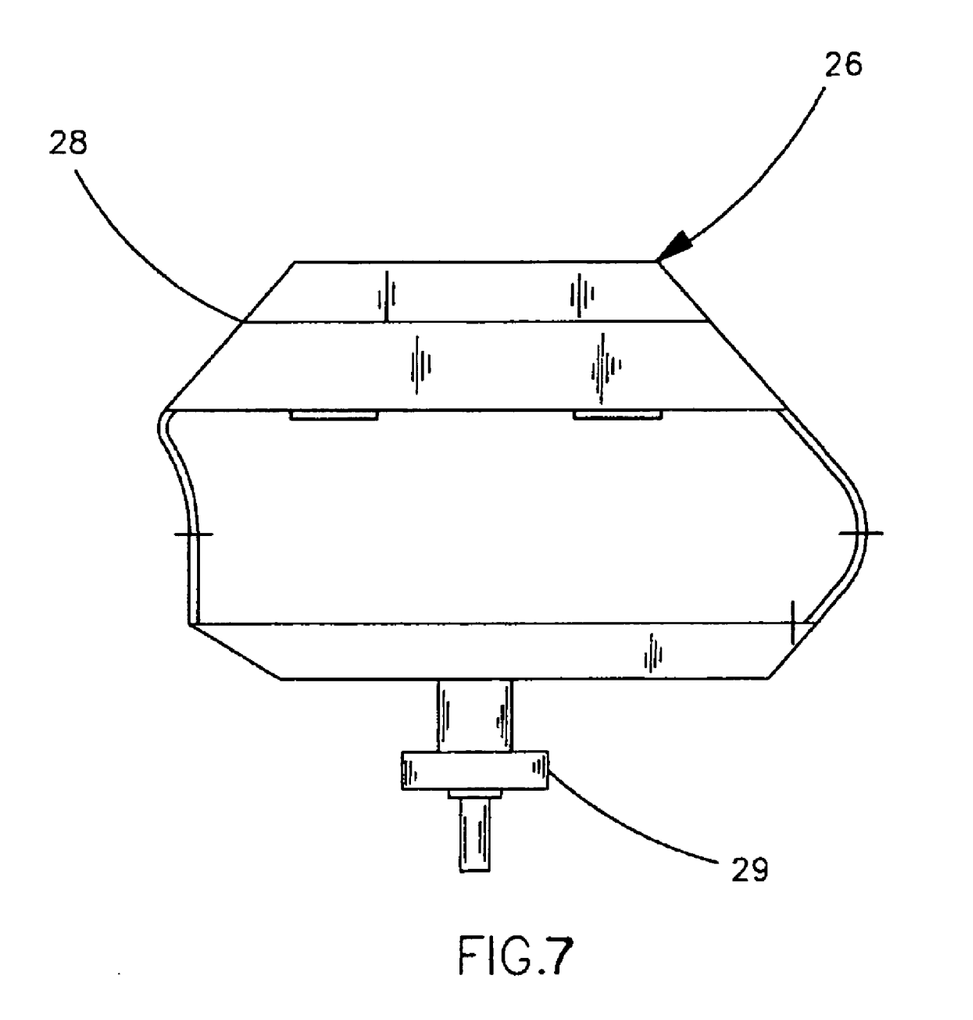
FIG. 7 is a side elevation of a pusher shoe useful with the invention.
Figure 8:
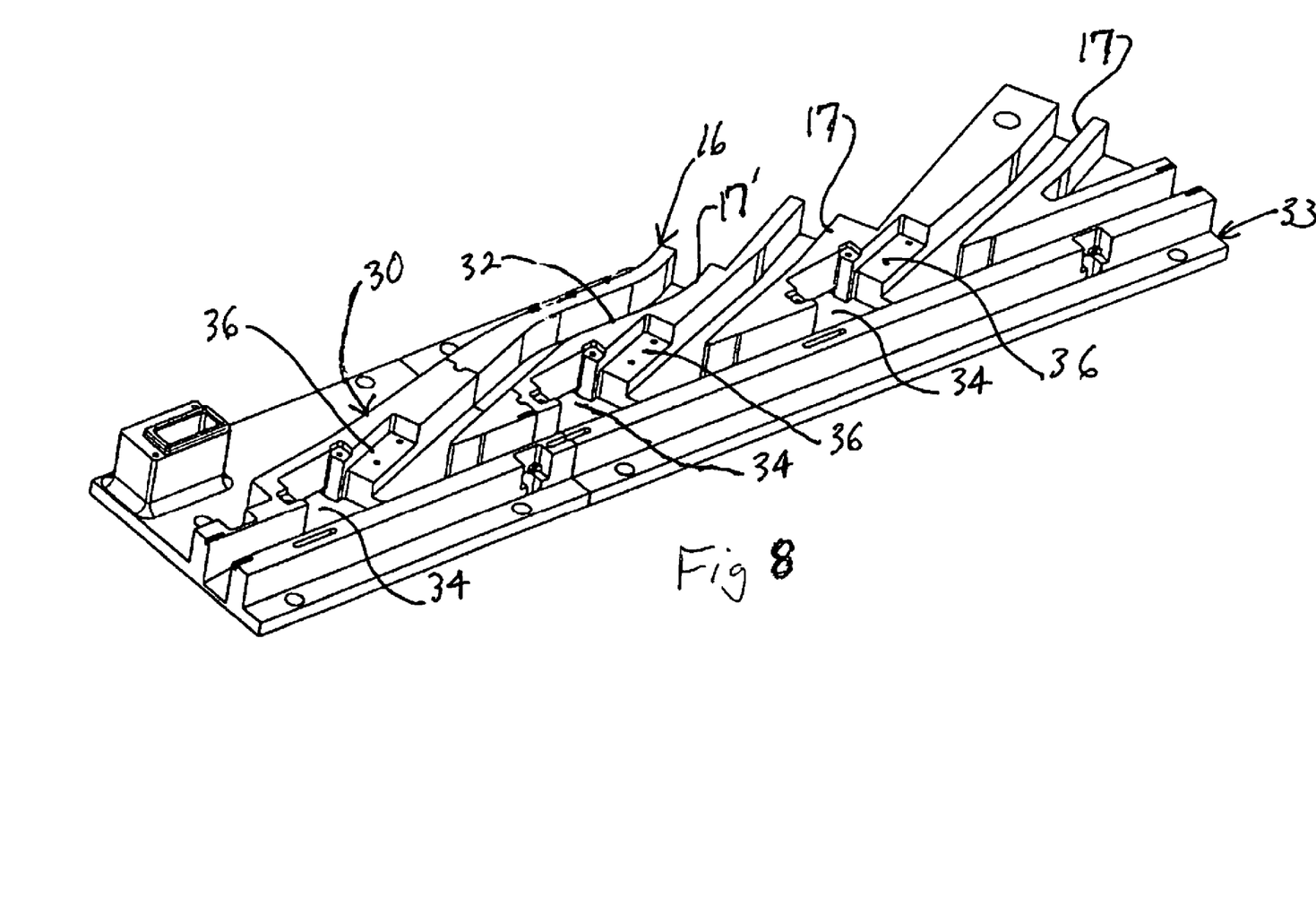
FIG. 8 is a perspective view of a diverter assembly.
Figure 9:
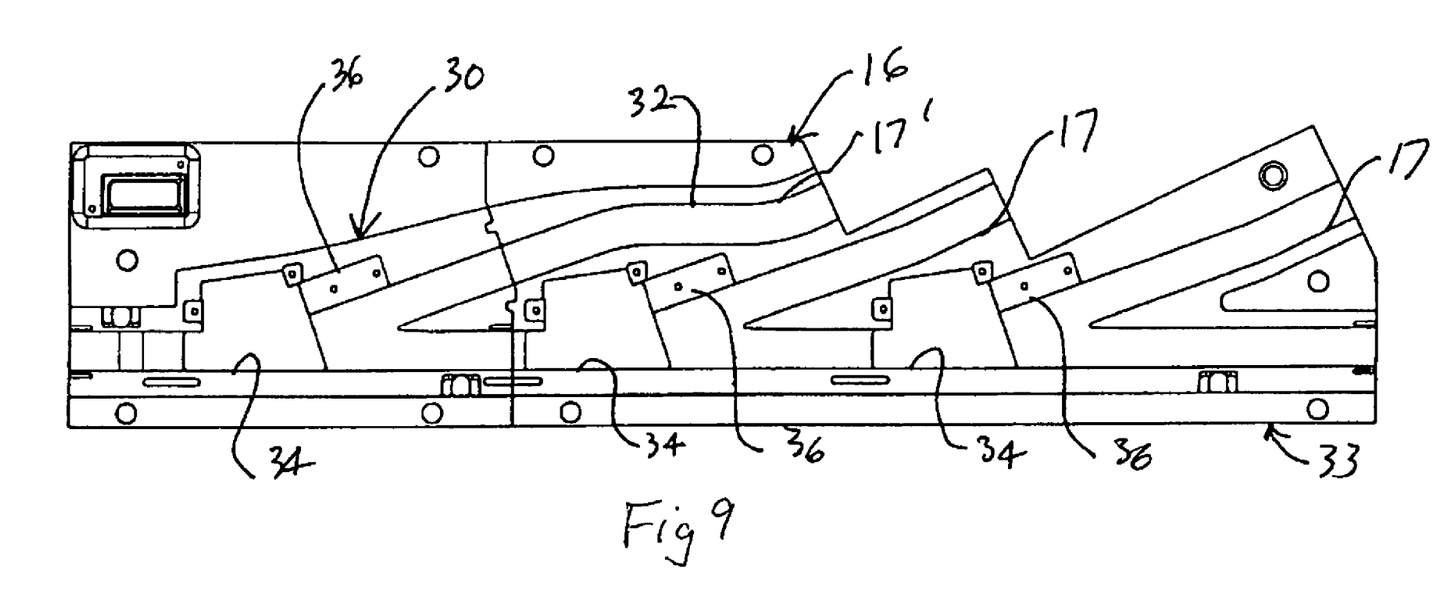
FIG. 9 is a top plan view of the diverter assembly in FIG. 8.
Figure 10:
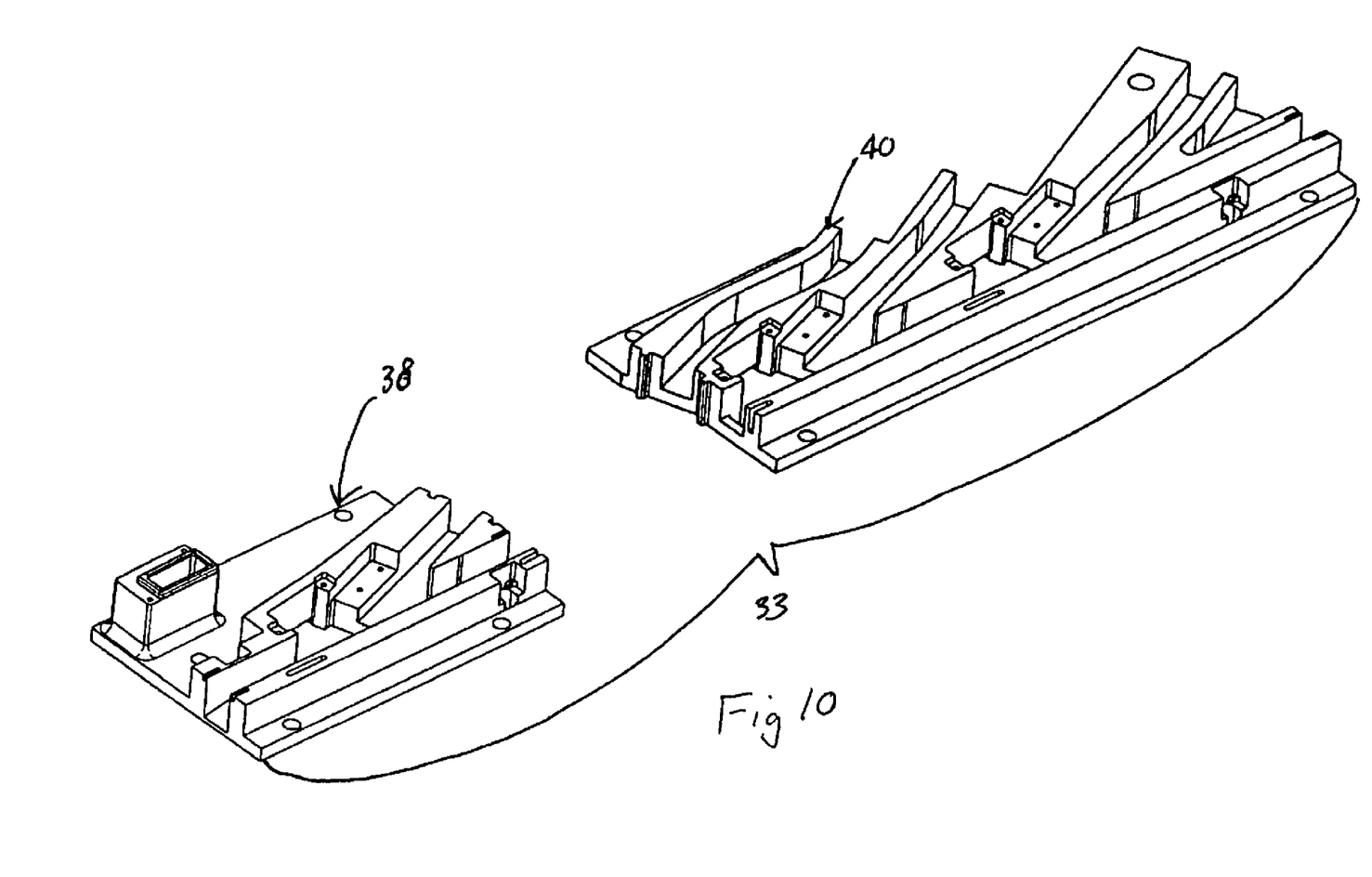
FIG. 10 is an exploded perspective view of the diverter assembly in FIGS. 8 and 9.
Figure 11:
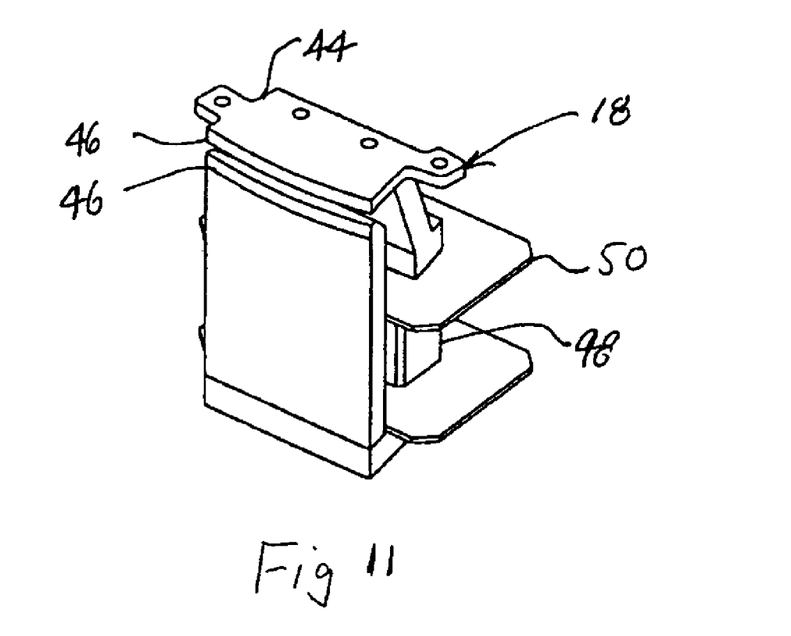
FIG. 11 is a perspective view of an electromagnetic actuator.
Figure 12:
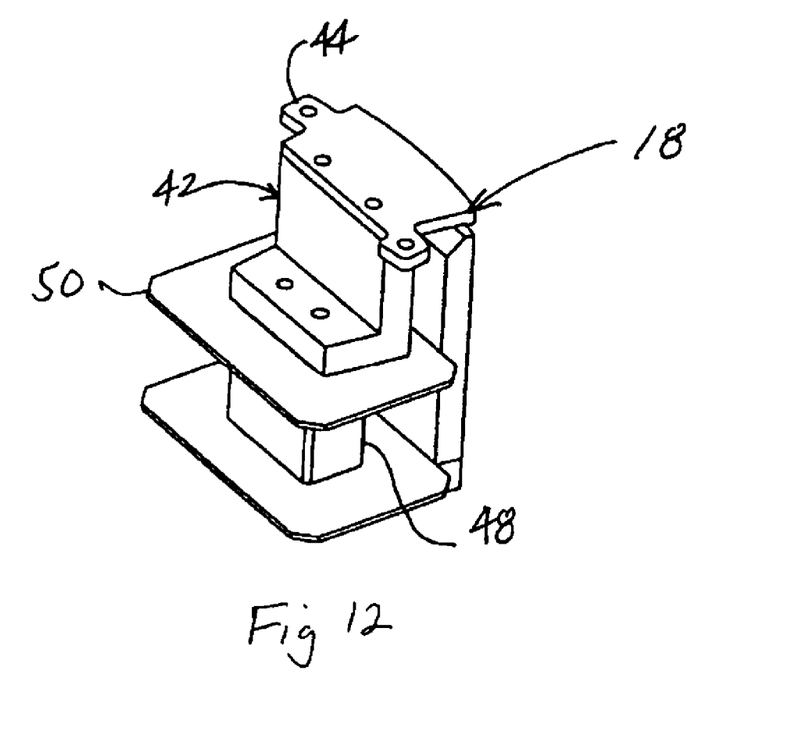
FIG. 12 is a perspective view of the actuator in FIG. 11 taken from an opposite direction.

In the illustrative embodiment, diverter assembly 16 is illustrated as being made up of three (3) actuators 18 and associated diverter rails 17. However, more than or fewer than this number may be provided. Each actuator 18, in the illustrative embodiment, is made up of an electromagnet of the type disclosed in U.S. Pat. No. 5,409,095, the disclosure of which is hereby incorporated herein by reference. Actuator 18 diverts a pusher shoe by magnetically attracting bearing 29 of the pusher shoe, which is illustrated in more detail in FIG. 7. As such, the mass of the pusher shoe 26 must be moved by the magnetic attraction between actuator 18 and bearing 29 in order to direct the pusher shoe to the corresponding diverter rail. As is known in the art, the ability of an electromagnet to generate magnetic flux is related to the size of the electromagnetic core and number of windings. The required magnetic force can be accomplished by providing actuators 18 of sufficient size. A large enough electromagnetic actuator can physically be accommodated by separating corresponding portions of actuators 18 by a distance equal to more than one shoe pitch P. Shoe pitch P is the distance between corresponding portions of adjacent pusher shoes. In the illustrated embodiment, the shoe pitch is approximately 6 inches, but may be a greater or lesser distance. This facilitates a larger electromagnet which increases magnetic flux production. In the illustrative embodiment, the corresponding portions of the actuators be separated by integer multiples of the shoe pitch P. In particular, in the illustrative embodiment, corresponding portions of actuators 18 are separated by 2P. However, they may be separated by a greater multiple of the shoe pitch.

Figure 3:
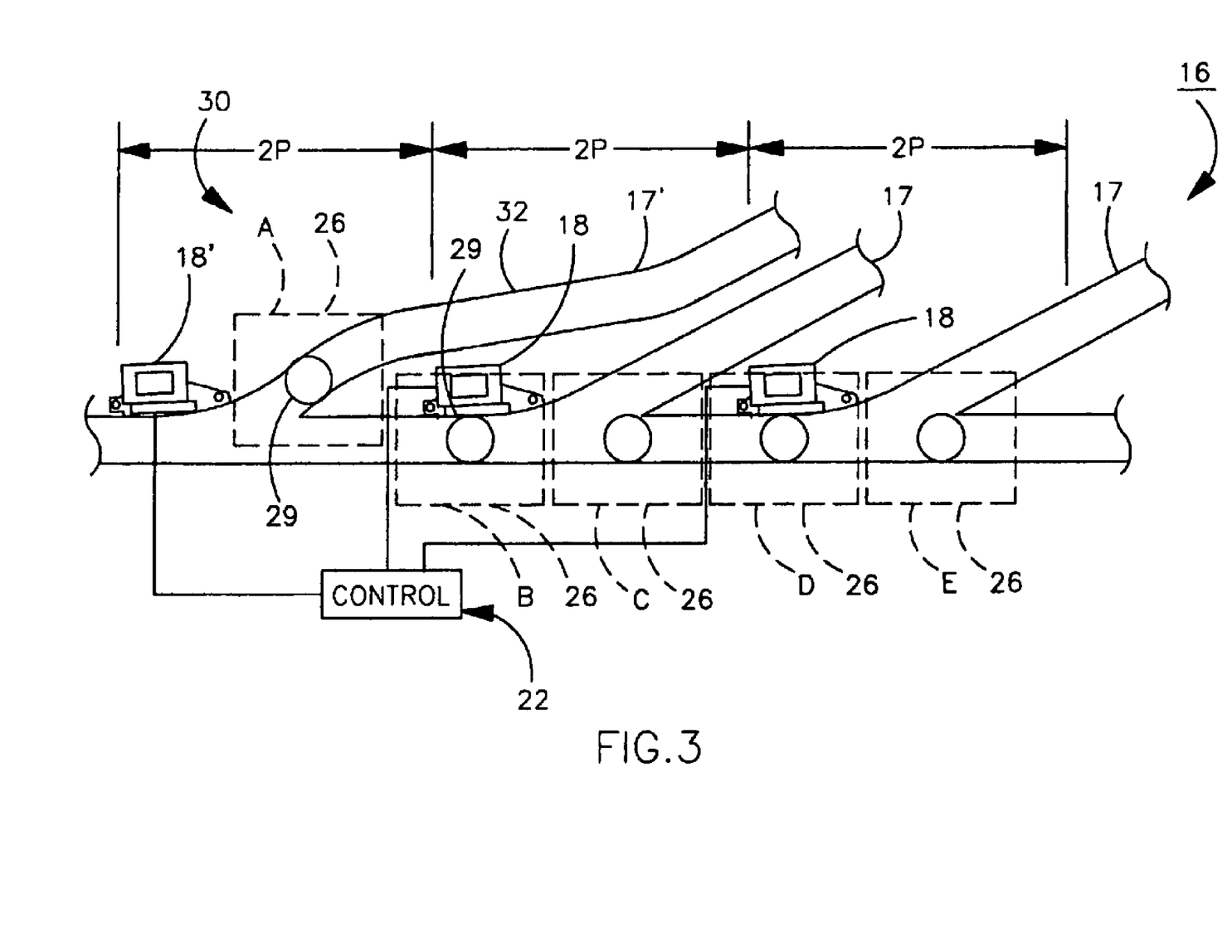
FIG. 3 is a top plan view of a diverter assembly illustrating operation of a pre-actuator.

Diverter assembly 16 includes a pre-actuator 30 and a plurality of conventional electromagnetic actuator and diverter rail combinations 18, 17 capable of parallel divert. Pre-actuator 30 includes an electromagnetic actuator 18' and a diverter rail 17'. Diverter rail 17' includes a dwell portion 32 whose function will be described below. Sorter assembly 10 additionally includes a control 22 which selectively energizes actuators 18. When a pusher shoe 26 is to be diverted by pre-actuator 30, control 22 energizes its actuator 18' prior to actuating the other actuator(s) 18 diverting a pusher shoe, as illustrated in FIG. 3. In particular, in the illustrative embodiment, control 22 energizes pre-actuator 30 earlier than the energization of any other actuator(s) by approximately the amount of time that it takes web 12 to travel one shoe pitch.

Figure 4:
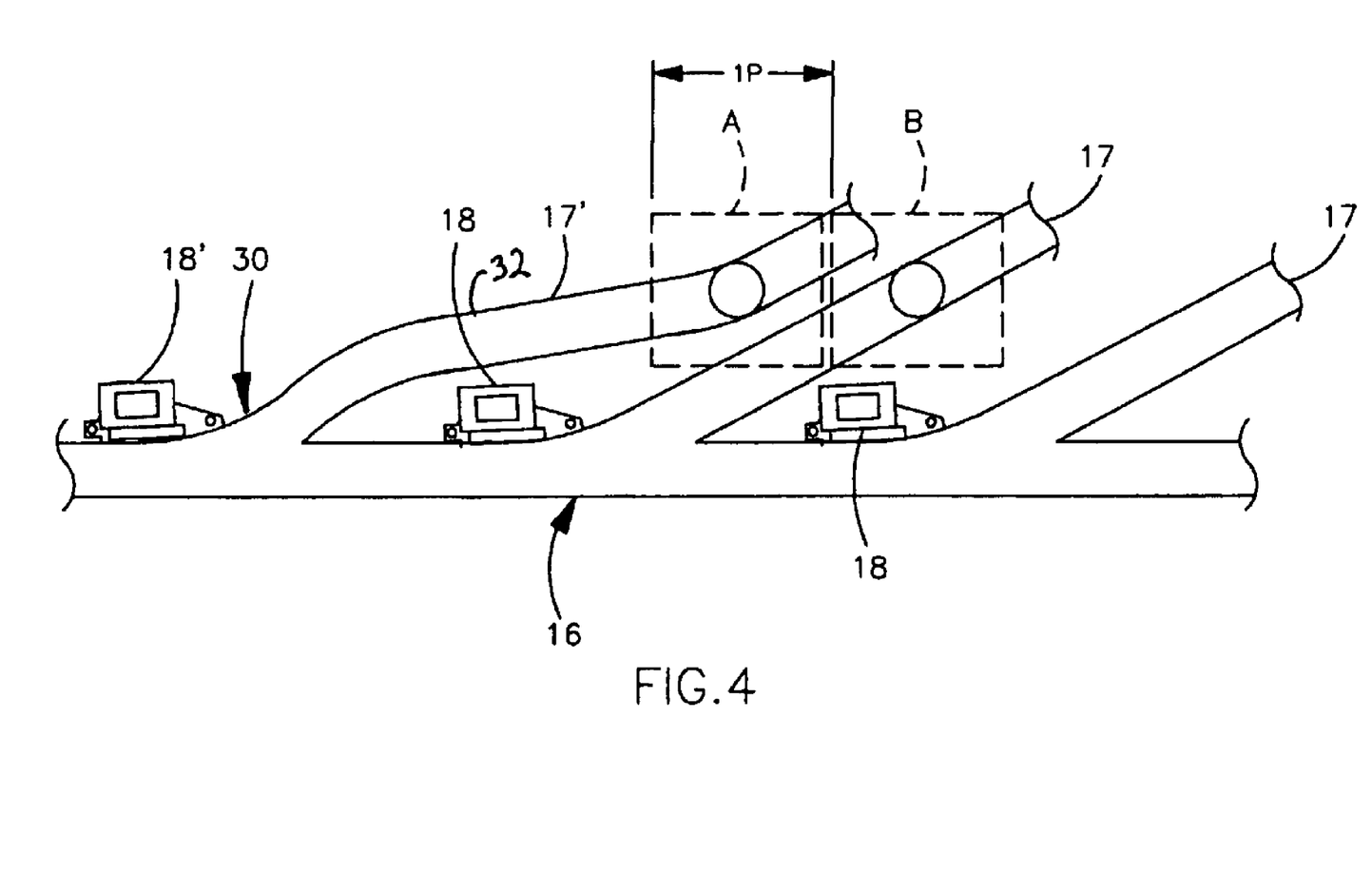
FIG. 4 is the same view as FIG. 3 illustrating the diverting of two pusher shoes that are spaced apart by one shoe pitch.

As seen in FIG. 4, when it is desired to divert two adjacent pusher shoes, which are separated by one shoe pitch, control 22 energizes pre-actuator 30 followed in time by the adjacent actuator 18. As previously set forth, pre-actuator 30 is energized prior to the adjacent actuator 18 in the time it takes web 12 to travel distance P. This allows the pusher shoe indicated as B to catch up with pusher shoe A because dwell portion 32 of diverter rail 17' momentarily delays lateral motion of pusher shoe A, i.e., upward motion as illustrated in FIG. 4. Once pusher shoes A and B are in line, as illustrated in FIG. 4, contact is made with an article and that article is diverted in a more conventional parallel fashion.

Figure 5:
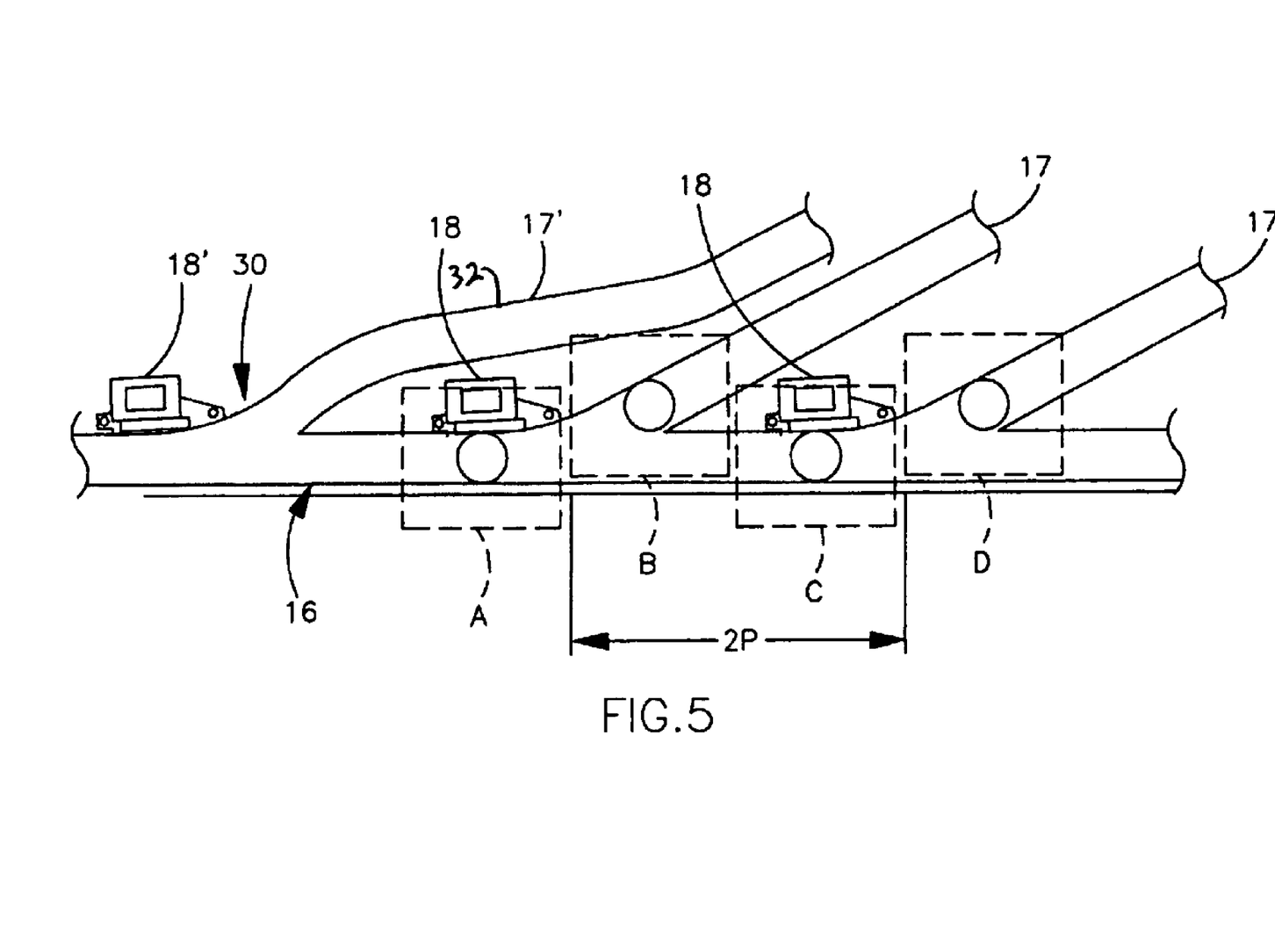
FIG. 5 is the same view as FIGS. 3 and 4 illustrating the diverting of two pusher shoes that are spaced apart by two shoe pitches.

When it is desired to divert two pusher shoes that are spaced apart by two shoe pitches, as illustrated in FIG. 5, adjacent actuators 18 are simultaneously actuated in the conventional fashion. This allows pusher shoes B and D to travel in line with each other until making contact with an article and subsequently diverting that article.

Figure 2:
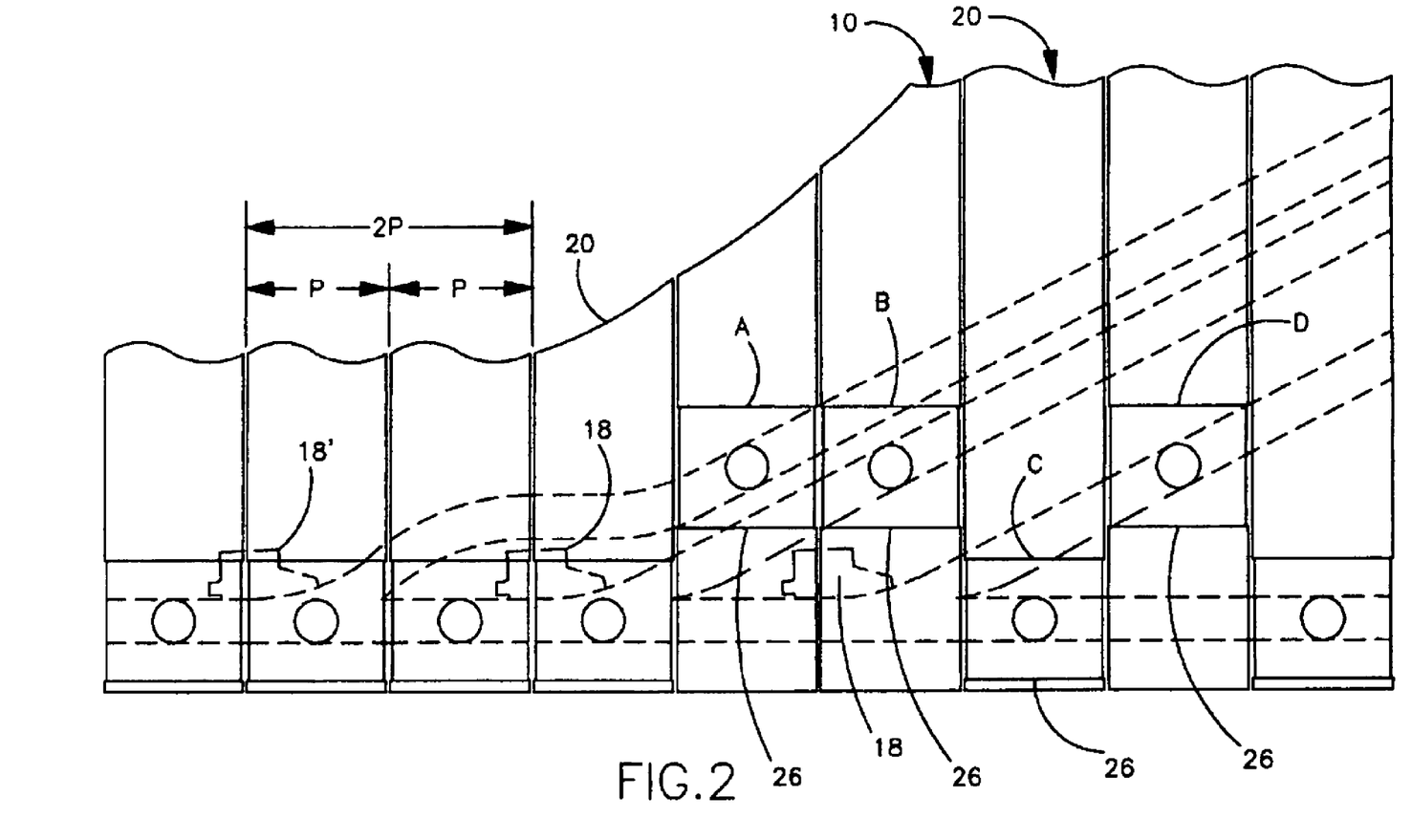
FIG. 2 is a top plan view of the sorter assembly in FIG. 1 illustrating patterns of pusher shoe movement.
Figure 6:
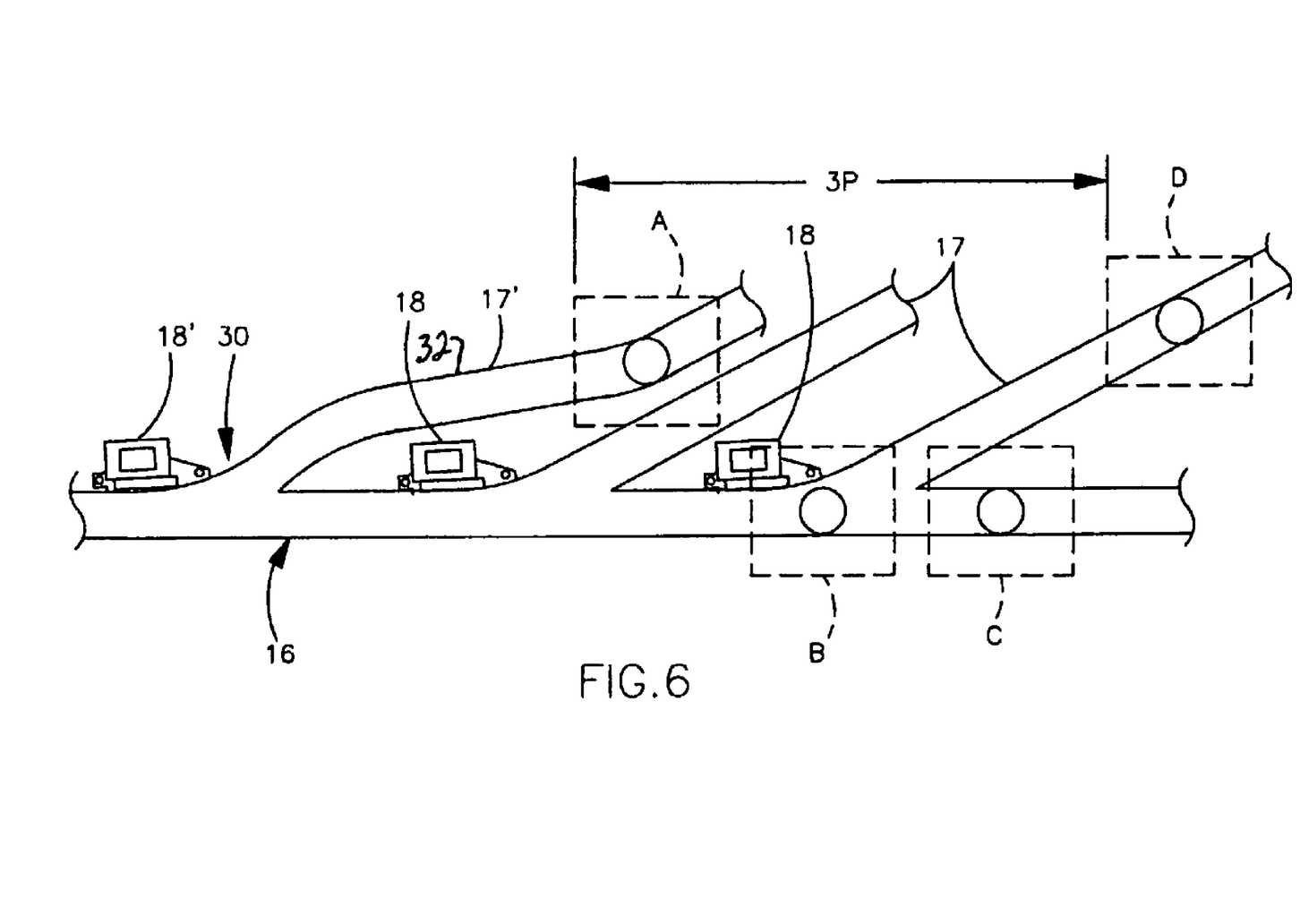
FIG. 6 is the same view as FIGS. 3–5 illustrating the diverting of two pusher shoes that are spaced apart by three shoe pitches.

FIG. 6 illustrates the case where it is desired to divert two pusher shoes that are spaced apart by three shoe pitches. This is accomplished by actuating pre-actuator 30 prior to the actuation of the actuator that is two actuators downstream from pre-actuator 30. This allows pusher shoe D to catch up with pusher shoe A by the time that the pusher shoe makes contact with the article. The article is then diverted across the conveying surface 11. FIG. 2 illustrates an example where three pusher shoes are diverted in line to laterally displace an article without initial rotation of the article.

While pre-actuator 30 is illustrated spaced upstream from the adjacent actuator 18 by the same spacing as the spacing between actuators 18, pre-actuator 30 may be spaced from adjacent actuator 18 by a greater or lesser amount. A greater spacing provides more gradual radii in diverter rail 17' prior to and after dwell portion 32. The skilled artisan would recognize that this greater spacing would be accompanied by an even longer lead time in the actuation of pre-actuator 30 from the other actuator(s) 18. The more gradual radius reduces acceleration noise in the pusher shoe traveling along divert rail 17' as it passes into and out of the dwell portion.

Diverter assembly 16, in the illustrative embodiment, includes a molding 33 made from a polymeric material, or the like. The molding is a three-dimensional shape that forms initial portions of diverting rails 17, 17' which are extended through extensions (not shown). Molding 33 additionally defines mounting openings 34 for mounting electromagnetic actuators 18. It also defines openings 36 for mounting permanent magnets downstream of each actuator at the respective diverter rail 17, 17'. As is known in the art, the permanent magnet assists the divert of the actuator by maintaining the diverted propelling member traveling in the direction of the respective diverting rail. In the illustrative embodiment, molding 33 includes a first section 38 and a second section 40. Sections 38 and 40 may be used together in order to form diverter assembly 16. However, first section 38 may be used by itself when it is desired to provide a traditional diagonal divert of the type disclosed in commonly assigned U.S. Pat. No. 5,127,510. This reduces the number of components that must be maintained by the manufacturer and/or at the jobsite for maintenance purposes.

Actuator 18, which is positionable in a mounting opening 34, includes a magnetic core 42 which extends in a magnetic circuit between face portions 46. The magnetic flux developed by actuator 18 is directed through face portions 46 which are positioned at the same elevation as movement of the pusher shoe propelling member, which is bearing 29 in the illustrative embodiment. Magnetic core 42 additionally includes a mounting plate 44 that mounts the actuator in a mounting opening 34 and a coil mounting portion 48 which mounts a coil winding (not shown) wound about a bobbin 50. In the illustrative embodiment, coil mounting portion 48 and bobbin 50 are located below face portions 46. This positions the coil below diverter rails 17, 17' and below the area of movement of the pusher shoe propelling member. This allows the coil mounting portion 48 and the corresponding coil to be larger than would be possible by positioning the coil mounting portion and coil at the same elevation as diverter rails 17, 17'.

Figure 13:
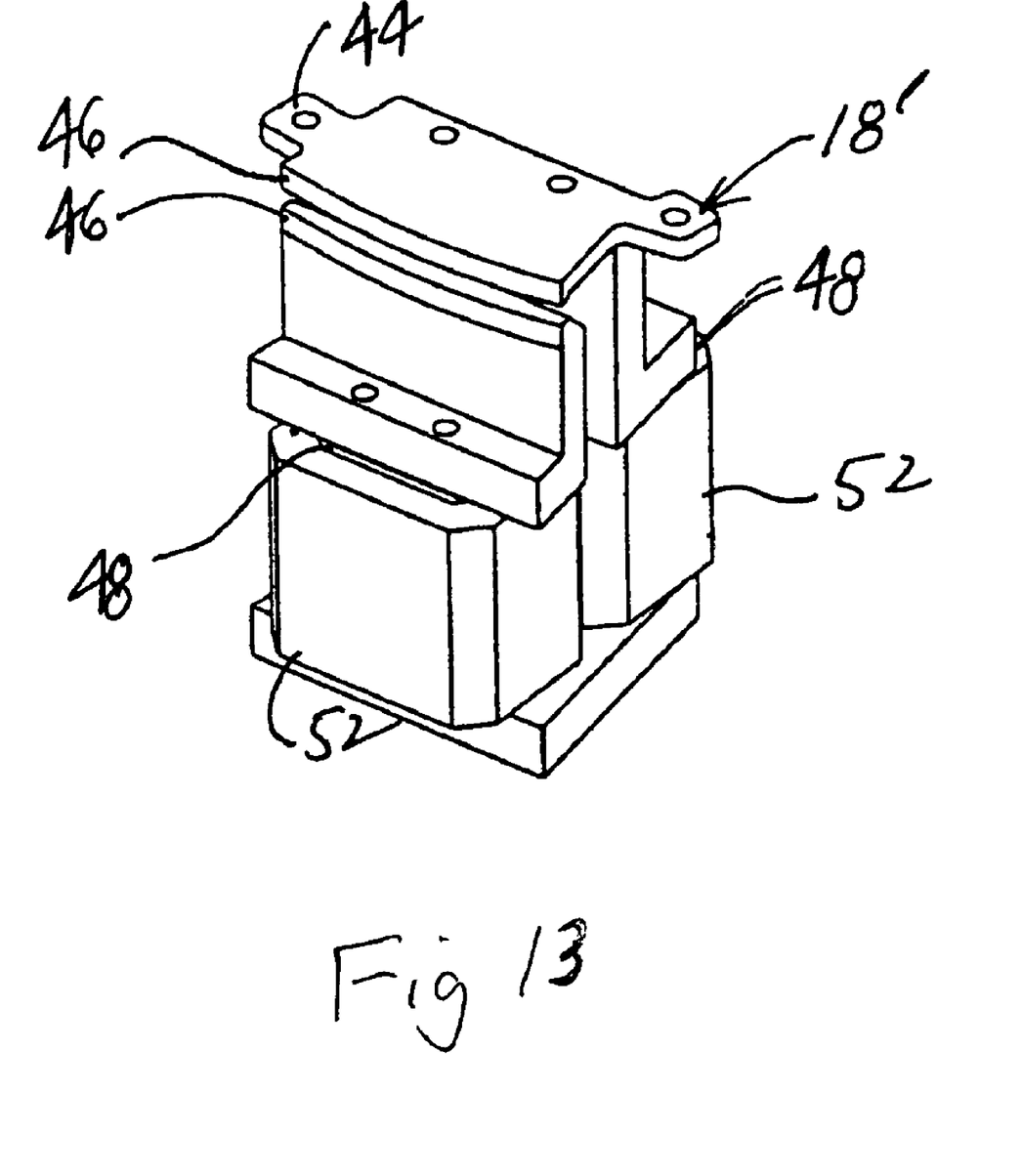
FIG. 13 is the same view as FIG. 11 of an alternative embodiment of an electromagnetic actuator.

Actuator 18 is configured to use a single coil bobbin 50. As illustrated in FIG. 13, an alternative actuator 18' is provided having two coil mounting portions 48 and a pair of coils 52, each wound around a respective bobbin (not shown). As with actuator 18, the coil mounting portions 48 and coils 52 of actuator 18' are positioned below face portions 46 and below diverter rails 17, 17', thereby allowing even greater magnetic flux to be generated across face portion 46 than with actuator 18.

Figures 14, 15:
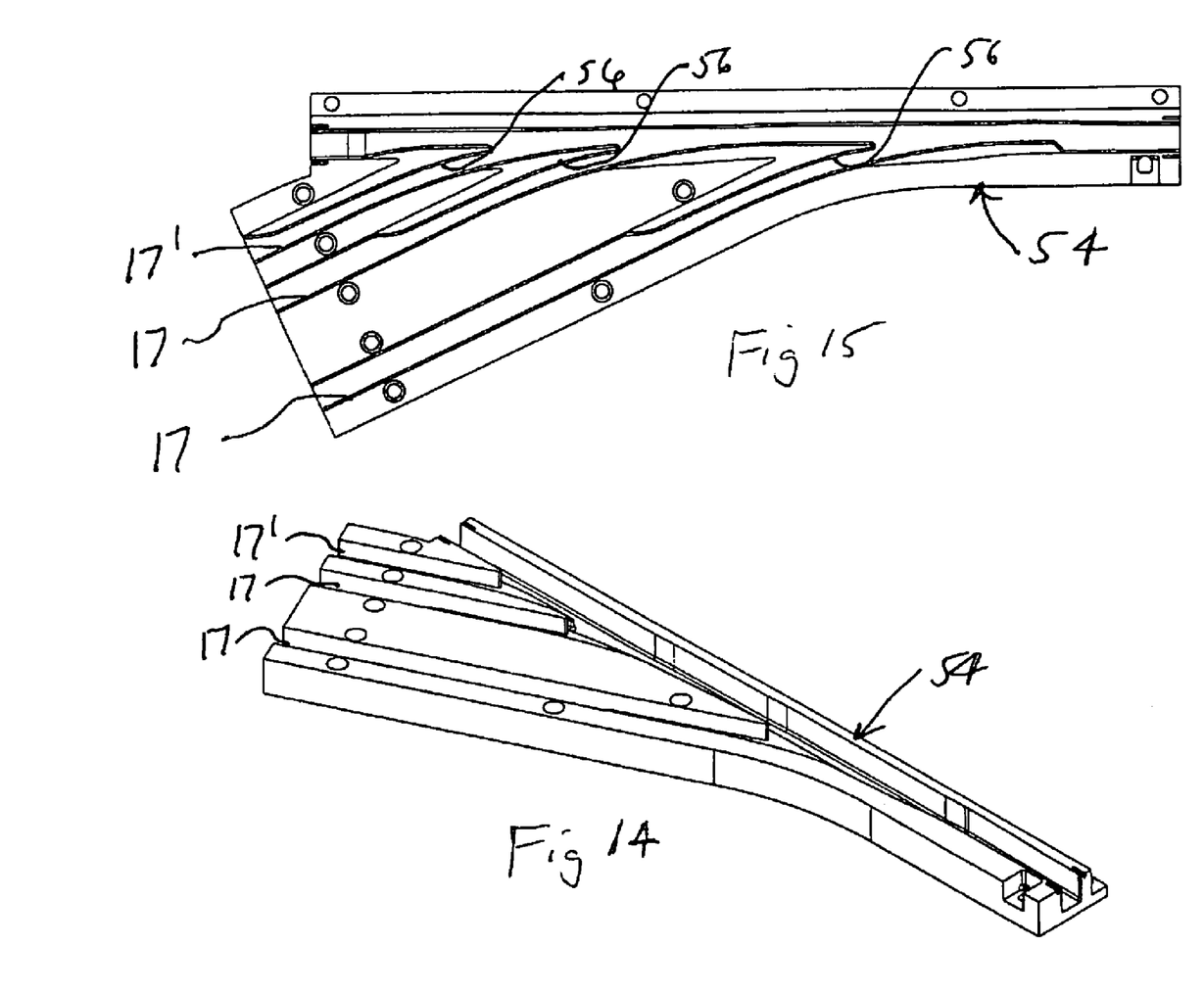
FIG. 14 is a perspective view of a diverting rail tail assembly.
FIG. 15 is a top plan view of the tail assembly of FIG. 14.

Diverter assembly 16 additionally includes a tail assembly 54 at the downstream end of diverter rail 17, 17' in order to redirect diverted pusher shoes into the direction of movement of web 12 (FIGS. 14 and 15). Tail assembly 54 includes curves surfaces 56 in order to provide smooth transition from diverter rails 17, 17' in order to reduce noise of the diverter pusher shoes being redirected toward the direction of movement of web 12. Spacing of the terminal portions of diverter rail 17, 17' are commensurate with their spacing as they exit molding 33.

The present invention facilitates the placement of the pusher shoe at least at the leading and trailing portions of the article in the manner disclosed in commonly assigned U.S. Pat. Nos. 6,041,909 and 5,927,465, the disclosure of which is hereby incorporated herein by reference. Moreover, the invention may be utilized in combination with a control that uses only one actuator and diverter rail to divert long packages diagonally. Also, although the invention is described with only two pusher shoes being diverted, to engage leading and trailing portions of an article, it may be desirable to divert more than two pusher shoes as illustrated in FIG. 2. The present invention is capable of accommodating a large actuator, or diverter switch, such as a large electromagnet, thereby allowing the diverter shoe to be directly magnetically actuated by the electromagnet. This can be accomplished in a manner whereby diverter shoes can be diverted that are one shoe pitch apart, two shoe pitches apart, three shoe pitches apart or, by adding additional actuators, four or more shoe pitches apart when contacting the article being diverted. This is accomplished utilizing a pre-actuator. The pre-actuator is separate from the other actuators by more than one shoe pitch and thereby also is capable of developing sufficient magnetic attraction to directly divert the diverter shoe.

While the invention is illustrated with the pre-divert at the most upstream end of the diverter assembly, it would be possible to place the pre-divert in a different position within the diverter assembly, such as between the first actuator and the last actuator. Other changes and modifications in the specifically described embodiments can be carried out without departing from the principles of the invention which is intended to be limited only by the scope of the appended claims, as interpreted according to the principles of patent law including the doctrine of equivalents.

What is claimed is:

1. A positive displacement sorter, comprising:
   a conveying surface traveling in a travel direction;
   a plurality of pusher shoes capable of traveling laterally of said conveying surface travel direction, said pusher shoes having article-contacting members extending at least partially above said conveying surface to displace articles on said conveying surface, corresponding portions of said pusher shoes being generally separated from each other in said travel direction by a shoe pitch;
   a plurality of diverter rails extending generally diagonally under said conveying surface and a plurality of actuators associated with said diverter rails, said actuators selectively directing pusher shoes onto corresponding diverter rails to divert ones of said pusher shoes and thereby displace an article; and
   a control,
   wherein corresponding portions of said actuators being separated from each other by more than said shoe pitch;
   wherein said control capable of controlling said actuators in a manner that selectively diverts at least two of said pusher shoes that are spaced apart from each other by more than said shoe pitch when actuated;
   wherein said plurality of diverter rails configured to cause one of the at least two of said pusher shoes to catch up with another of the at least two of said pusher shoes in said travel direction, wherein said at least two of said pusher shoes are substantially spaced apart by no more than said shoe pitch when displacing an article.

2. The positive displacement sorter as claimed in claim 1 wherein said control is further capable of controlling said actuators in a manner that selectively diverts at least two of said pusher shoes that are substantially spaced apart by two shoe pitches or by three shoe pitches when actuated.

3. The positive displacement sorter as claimed in claim 1 wherein corresponding portions of said actuators are substantially separated from each other by twice said shoe pitch.

4. The positive displacement sorter as claimed in claim 1 wherein said actuators comprise magnetic actuators.

5. The positive displacement sorter as claimed in claim 4 wherein each of said pusher shoes comprises a bearing engaged by a corresponding one of said diverting rails and wherein said magnetic actuators magnetically attract said bearing to direct one of said pusher shoes onto the corresponding diverting rail.

6. The positive displacement sorter as claimed in claim 4 wherein at least one of said magnetic actuators comprises a magnetic core and an electrical coil at a portion of said core, said electrical coil being positioned below said diverter rails.

7. A positive displacement sorter, comprising:
   a conveying surface traveling in a travel direction;
   a plurality of pusher shoes capable of traveling laterally of said conveying surface travel direction, said pusher shoes having article-contacting members extending at least partially above said conveying surface to displace articles on said conveying surface, corresponding portions of said pusher shoes being generally separated from each other in said travel direction by a shoe pitch;
   a plurality of diverter rails extending generally diagonally under said conveying surface and a plurality of actuators associated with said diverter rails, said actuators selectively directing pusher shoes onto corresponding diverter rails to divert ones of said pusher shoes and thereby displace an article; and
   a control,
   wherein one of said actuators comprises a pre-actuator and wherein the one of said diverter rails associated with said pre-actuator comprises a portion at a different angle with respect to said travel direction than corresponding portions of the other said diverter rails, wherein said control actuating said pre-actuator prior in time to actuating another of said actuators to divert at least two pusher shoes.

8. The positive displacement sorter as claimed in claim 7 wherein said pre-actuator is upstream of the other of said actuators in said travel direction.

9. The positive displacement sorter as claimed in claim 7 wherein said control actuating said pre-actuator and said another of said actuators to divert at least two pusher shoes that are in-line with each other with respect to said travel direction when displacing an article.

10. The positive displacement sorter as claimed in claim 7 wherein corresponding portions of said actuators are substantially separated from each other by at least twice said shoe pitch.

11. The positive displacement sorter as claimed in claim 7 wherein said actuators comprise magnetic actuators.

12. The positive displacement sorter as claimed in claim 11 wherein each of said pusher shoes comprises a bearing engaged by a corresponding one of said diverting rails and wherein said magnetic actuators magnetically attract said bearing to direct one of said pusher shoes onto the corresponding diverting rail.

13. The positive displacement sorter as claimed in claim 11 wherein at least one of said magnetic actuators comprises a magnetic core and an electrical coil at a portion of said core, said electrical coil being positioned below said diverter rails.

14. The positive displacement sorter as claimed in claim 11 wherein said control is capable of controlling said actuators in a manner that diverts at least two pusher shoes that are spaced apart when displacing an article by any integer increment of said shoe pitch between 1 and n, where n is the number of said actuators.

15. A method of sorting articles, comprising:
providing a conveying surface traveling in a travel direction;
providing a plurality of pusher shoes capable of traveling laterally of said conveying surface travel direction, said pusher shoes having article-contacting members extending at least partially above said conveying surface to displace articles on said conveying surface, corresponding portions of said pusher shoes being generally separated from each other in said travel direction by a shoe pitch;
providing a plurality of diverter rails extending generally diagonally under said conveying surface and a plurality of actuators associated with said diverter rails;
selectively directing pusher shoes onto corresponding diverter rails by activating said actuators to divert ones of said pusher shoes and thereby displace an article, wherein corresponding portions of said actuators being separated from each other by more than said shoe pitch;
selectively activating at least two of said actuators in a manner that diverts at least two of said pusher shoes that are spaced apart from each other by more than said shoe pitch when actuated; and
diverting the at least two of said pusher shoes with said plurality of diverter rails in a manner that causes one of the at least two of said pusher shoes to catch up with another of said pusher shoes in said travel direction wherein said at least two of said pusher shoes are substantially spaced apart by no more than said shoe pitch when displacing the article.

16. The method as claimed in claim 15 further including selectively activating at least two of said actuators in a manner that diverts at least two of said pusher shoes that are spaced apart by two shoe pitches or by three shoe pitches.

17. The method as claimed in claim 15 wherein corresponding portions of said actuators are substantially separated from each other by twice said shoe pitch.

18. The method as claimed in claim 15 wherein one of said actuators comprises a pre-actuator and wherein the corresponding one of said diverter rails associated with said pre-actuator comprises a portion at a different angle with respect to said travel direction than corresponding portions of the other said diverter rails and further including activating said pre-actuator prior in time to actuating another of said actuators.

19. The method as claimed in claim 15 including selectively activating said at least two actuators to divert at least two pusher shoes that are in-line with each other with respect to said travel direction when displacing an article.

20. The method as claimed in claim 15 including selectively actuating said at least two actuators in a manner to divert at least two pusher shoes that are spaced apart when displacing an article by any integer increment of said shoe pitch between 1 and n, where n is the number of said actuators.

* * * * *